United States Patent [19]
Blankenship et al.

[11] Patent Number: 5,827,018
[45] Date of Patent: Oct. 27, 1998

[54] COUNTERSINK CUTTERS HAVING A FREE-SPINNING PILOT

[75] Inventors: Thomas O. Blankenship, O'Fallon; David L. Fritsche, St. Charles, both of Mo.

[73] Assignee: McDonnell Douglas, St. Louis, Mo.

[21] Appl. No.: 739,161

[22] Filed: Oct. 30, 1996

[51] Int. Cl.$^6$ ........................................... B23B 51/10
[52] U.S. Cl. .......................... 408/82; 408/113; 408/201; 408/713
[58] Field of Search .................................. 408/79, 80, 81, 408/82, 113, 114, 201, 713

[56] References Cited

U.S. PATENT DOCUMENTS

| | | | |
|---|---|---|---|
| 897,041 | 8/1908 | Weller | 408/82 |
| 1,724,005 | 9/1929 | Christensen | 408/201 |
| 2,009,168 | 7/1935 | Dettmer | 408/201 |
| 2,374,552 | 4/1945 | Marini | 408/201 |
| 2,422,279 | 6/1947 | Zimmer | 408/113 |
| 4,197,042 | 4/1980 | Krhounek et al. | 408/713 |
| 5,071,295 | 12/1991 | Greig | 408/201 |

*Primary Examiner*—Daniel W. Howell
*Attorney, Agent, or Firm*—Veo Peoples, Jr.; Ben Hudson, Jr.

[57] ABSTRACT

This invention discloses an improved cutting tool such as a counterbore cutter or piloted reamer that is comprised of a free-spinning pilot connected to the cutting tool. The free-spinning pilot allows the cutting tool to rotate within it while it makes firm contact with a pre-drilled hole in material to be cut improving the location of the cutter relative to the hole.

2 Claims, 1 Drawing Sheet

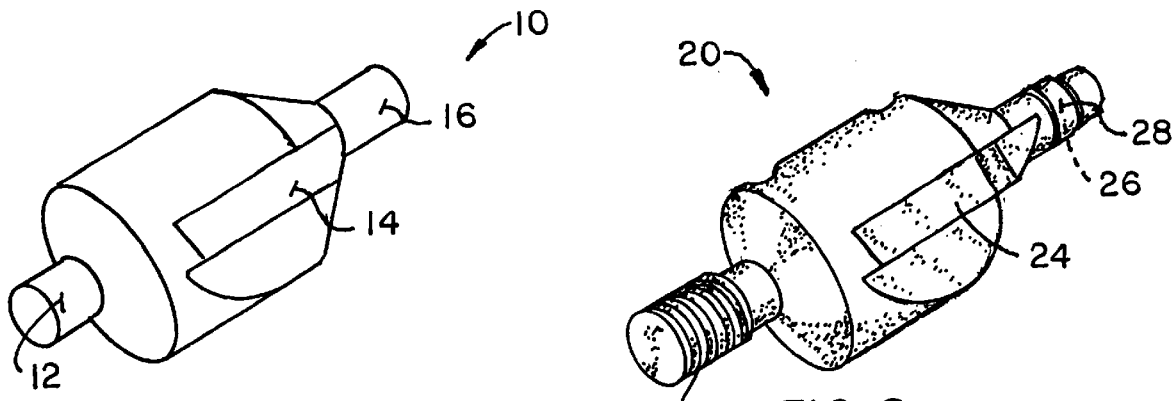
FIG. 1 PRIOR ART
FIG. 2
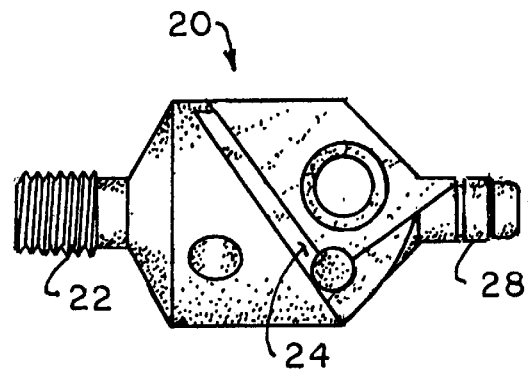
FIG. 3
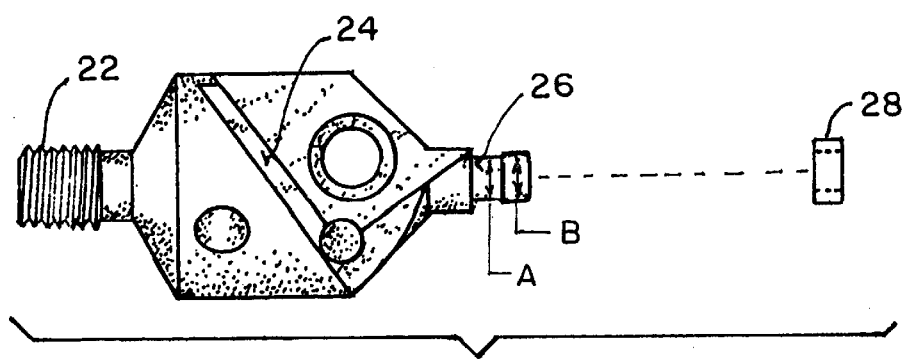
FIG. 4

COUNTERSINK CUTTERS HAVING A FREE-SPINNING PILOT

BACKGROUND OF THE INVENTION

1. Field of the Invention.

This invention relates generally to cutters which are designed to countersink holes, and more particularly, cutters which are designed to countersink holes which has as a feature an integral pilot which guides the cutter within the hole as the countersink is being cut. This process results in several problems. As a fixed pilot on a countersink cutter rotates in a previously prepared hole, any cocking of the cutter will elongate or damage the hole. As industry moves towards using lighter weight materials for construction, the tools used to machine these materials are required to have more precision and accuracy to reduce waste of material from damages by tooling. Also, a fixed pilot requires a generous clearance in the previously prepared hole resulting in countersinks which are not aligned or perpendicular with the holes.

2. Brief Description of the Prior Art.

Referring to FIG. 1, there is shown generally, in a perspective view, an illustration of a prior art cutter 10. The cutter 10 has a base or shank portion 12 that is disposed to be mounted in a hand held drill equipped with a precision depth stop or automatic drill press, not shown but well known to those skilled in the art. The cutter has cutting surfaces 14 which are designed to cut material stock upon rotation of the cutter. The cutter 10 is a countersink or reamer which is further comprised of a non-cutting cylindrical pilot section which is designed to serve as a guide for entering a pre-machined hole in stock material to be cut. The problem that exists in the art today is that when the fixed pilot 16 is misaligned in the hole of the material to be machined by a hand drill or automatic drill press, the rotating fixed pilot 16 is disposed to damage the material or elongate and damage the hole. Also, the fixed pilot requires a generous clearance in the previously prepared hole resulting in countersinks which are not concentric or perpendicular with the holes.

It is an object of this invention to provide a cutter which has a pilot that can guide the cutter into the hole of the material to be machined without causing any damage by the rotation of the cutter and improve the location of the countersink relative to the hole. It would be desirable if there were provided a cutter which has a pilot guide which did not rotate with the rotation of the cutter as driven by the hand driven drill or the automatic drill press.

SUMMARY OF THE INVENTION

There is provided by this invention a cutter design that has a free-spinning pilot connected to the cutter that does not rotate with the cutter. The free-spinning pilot is generally comprised of an axial rotatable spindle or sleeve mounted on the cutter's pilot that allows the cutter to spin freely within the spindle. Thus, the pilot can maintain firm contact with the hole within the rotatable spindle and guide the cutter within the hole without the rotation of the cutter causing possible damage to the material and improving its location relative to the hole.

BRIEF DESCRIPTION OF THE DRAWINGS

FIG. 1 is a perspective view of a prior art cutter;

FIG. 2 is a perspective view of a cutter incorporating the principles of this invention; and FIG. 3 is a side view of a cutter incorporating the principles of this invention.

FIG. 4 is a side view, with parts broken away, of a cutter incorporating the principles of this invention.

BRIEF DESCRIPTION OF THE PREFERRED EMBODIMENT

Referring to FIGS. 2, 3 and 4, there is shown a cutter 20 having a base or shank portion 22 that is disposed to be mounted in a hand held drill equipped with a precision depth stop or automated machine tool not shown but well known to those skilled in the art. The cutter 20 has cutting surfaces 24 that cut stock material when the cutter 20 is rotated. Connected to the cutter 20 is a pilot section 26 that guides the cutter into pre-existing or pre-machined holes of the material to be cut. Mounted upon the pilot 26 is an axially rotatable cylinder or spindle 28 that freely rotates on, and is connected to, the cutter's pilot 26. The spindle 28 is designed such that the cutter's pilot section can freely spin within the spindle. Thus, when the spindle 28 enters a hole to be machined, the spindle maintains contact with the hole without any rotation while the cutter is freely rotating within the spindle. This allows the pilot's spindle 28 to effectively guide the cutter into the hole without causing any damage due to misalignment of the cutting assembly 10 and improve the countersink location relative to the hole.

As shown in FIG. 4, the cutter 20 has a pilot 26 that is ground to a reduced diameter A. The diameter B toward the end of the pilot is slightly bigger to act as a retaining feature. The sleeve or spindle 28 has an inside diameter slightly greater than the A dimension on a countersink cutter, and an outside diameter 0.001 inch smaller than the hole diameter to be countersunk with a length sightly less than the length of the A diameter section. The inside diameter of the sleeve or spindle 28 and the altered outside diameter A of the countersink cutter pilot 26 are coated with a dry film lubricant. The spindle 28 is pressed onto the diameter A and retained by the diameter B.

Although there has been illustrated and described specific structure and details of operation, it is clearly understood that the same were merely for purposes of illustration and that changes and modifications may be readily made therein by those skilled in the art without departing from the spirit and scope of this invention. The invention described here includes any cutting tool which pilots from an existing hole. For example, counterbore cutters, piloted reamers, hole saws, etc.

What is claimed:

1. A countersink cutting tool, comprising:
   a cylindrical axial elongated body having a cylindrical cutting surface having a diameter thereon disposed to cut material with the rotation of the cylindrical body;
   a shank section at one end of the cylindrical body wherein the shank section is generally disposed to be mounted within a hand held drill equipped with a precision depth stop or automated machine tool;
   a front non-cutting section of the cylindrical body having a diameter less than the diameter of the cylindrical cutting section, the diameter of the non-cutting section being coated with a dry film lubricant wherein the non-cutting section acts as a guide for the cylindrical body; and
   a cylindrical spindle section having an inside diameter coated with a dry film lubricant and an outside diameter, said spindle being axially mounted upon the cylindrical non-cutting section wherein the cylindrical non-cutting section is freely rotatable within the spindle.

2. A countersink cutting tool as recited in claim 1 wherein the cylindrical spindle section has a reduced outside diameter smaller than the cylindrical cutting section which firmly mates in a non-rotatable position with an aperture to be machined aligning the cutting tool with the aperture as it rotates within the cylindrical spindle.

* * * * *